United States Patent
Morita et al.

(10) Patent No.: US 9,797,990 B2
(45) Date of Patent: Oct. 24, 2017

(54) ECHO DISPLAY DEVICE AND CURSOR MOVEMENT CONTROL METHOD

(71) Applicant: FURUNO ELECTRIC CO., LTD., Nishinomiya, Hyogo (JP)

(72) Inventors: Yu Morita, Nishinomiya (JP); Yugo Kubota, Nishinomiya (JP); Hidetoshi Kaida, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 304 days.

(21) Appl. No.: 14/847,343

(22) Filed: Sep. 8, 2015

(65) Prior Publication Data

US 2016/0077194 A1    Mar. 17, 2016

(30) Foreign Application Priority Data

Sep. 12, 2014  (JP) ................................. 2014-186914

(51) Int. Cl.
  *G01S 7/22*    (2006.01)
  *G06F 3/0354*  (2013.01)

(52) U.S. Cl.
  CPC ............ *G01S 7/22* (2013.01); *G06F 3/03549* (2013.01)

(58) Field of Classification Search
  CPC ................................ G01S 7/22; G06F 3/03549
  See application file for complete search history.

(56) References Cited

U.S. PATENT DOCUMENTS

| 5,515,099 A * | 5/1996 | Cortjens ............ H04N 5/23203 348/14.03 |
| 6,418,424 B1 * | 7/2002 | Hoffberg ................... G06F 3/00 386/E5.004 |
| 6,683,536 B2 * | 1/2004 | Suzuki ..................... G01S 7/064 340/815.4 |

(Continued)

FOREIGN PATENT DOCUMENTS

| JP | H08-087395 A | 4/1996 | |
| JP | GB 2379816 A * | 3/2003 | ............ G01S 7/003 |

(Continued)

*Primary Examiner* — John B Sotomayor
(74) *Attorney, Agent, or Firm* — Global IP Counselors, LLP

(57) ABSTRACT

There is provided an echo display device that is easy to manipulate and allows echoes that appear on an echo screen to be designated easily, quickly, and reliably with a cursor. An information display device includes a display component 10, a track ball, and a controller. The display component 10 displays a radar image in real time based on echo information inputted from a radar antenna. The track ball is manipulated to move a cursor 5 displayed in the radar image. The controller includes a cursor display position determination component, and this cursor display position determination component determines the display position of the cursor 5 in the radar image based on manipulation of the track ball. Also, when the display position of an echo E1 is within a specific range from a cursor display position (position P2) after the cursor 5 has moved by manipulation of the track ball, the cursor display position determination component moves the display position of the cursor 5 to a position P3 that coincides with this echo E1.

14 Claims, 10 Drawing Sheets

(56) References Cited

U.S. PATENT DOCUMENTS

2012/0036016 A1* 2/2012 Hoffberg .............. G05B 15/02
    705/14.58
2016/0077194 A1* 3/2016 Morita .............. G06F 3/03549
    342/183
2017/0119353 A1* 5/2017 Nielsen .............. A61B 8/467

FOREIGN PATENT DOCUMENTS

| JP | WO 2016042932 A1 | * | 3/2016 | ............ B63B 49/00 |
| JP | 2017058271 A | * | 3/2017 | ............ G01S 7/062 |
| JP | EP 3144697 A1 | * | 3/2017 | ............ G01S 7/24 |
| JP | EP 3144698 A1 | * | 3/2017 | ............ G01S 7/062 |

* cited by examiner

ECHO DISPLAY DEVICE AND CURSOR MOVEMENT CONTROL METHOD

CROSS-REFERENCE TO RELATED APPLICATIONS

This application claims priority to Japanese Patent Application No. 2014-186914 filed on Sep. 12, 2014. The entire disclosure of Japanese Patent Application No. 2014-186914 is hereby incorporated herein by reference.

BACKGROUND

Field of the Invention

The present invention relates mainly to an echo display device with which a cursor displayed on a screen can be manipulated.

Background Information

There are well-known conventional configurations that comprise a display and a pointing device, with which the user can use the pointing device to designate something displayed on the display. For instance, Japanese Laid-Open Patent Application Publication No. H8-87395 (Patent Literature 1) discloses an icon menu selection method and system for selecting an icon menu, as well as an information processing device.

The information processing device in Patent Literature 1 comprises a first memory means and a second memory means. The first memory means stores a plurality of icons, an input means for receiving the input designated by the user, and icon information that includes icon image data, names, display coordinates, and recognition ranges for the number of icons included. The second memory means stores cursor coordinates for the pointing device. This information processing device calculates the distance between the icon coordinates and the cursor coordinates, and selects the icon with the shortest distance among the calculated distances, which determines the icon selected by the user with the pointing device outside the icon recognition range.

With Patent Literature 1, due to the above configuration, a nearby icon is selected even if the button is pressed outside the icon recognition range, so the goal is to improve the efficiency of selection with users who are not used to pointing devices.

SUMMARY

In the past, there was a known radar device that performed microwave transmission with a rotating antenna, and received reflected waves (echoes) from a target to produce a radar image.

These radar devices sometimes have a TT (target tracking) function for aiding in the navigation of ships. A "TT function" refers to sensing the position and speed of a target such as another ship that is within the surrounding waters of the first ship, based on how the radar image changes, calculating a simulation of the anticipated course or the closest point of approach of the target, and issuing a warning if there is danger of colliding with the other ship.

If the user of a radar device having a TT function wants to track as a target a particular target echo appearing in the radar image, he uses a pointing device to manipulate a cursor, and designates that echo. However, radar echoes come in a variety of sizes, shapes, and positions, and their position, size, and so forth change in real time. Also, the swaying of the ship on which the radar device is installed can cause the user's hands to be unstable. Therefore, there are situations when it is difficult to designate the echo desired by the user with the cursor.

In regard to this, the above-mentioned Patent Literature 1 merely discloses a case in which the user selects an icon that is displayed at a constant size in a predetermined location on the display screen, and is basically not moving. That is, the configuration in Patent Literature 1 does not at all take into account the selection of echoes that appear and disappear at irregular timing on an echo screen such as a radar image, and that are irregular in both shape and location, and vary over time.

The present invention was conceived in light of the above situation, and it is an object thereof to provide an echo display device that is easy to manipulate and allows echoes that appear on an echo screen to be designated easily, quickly, and reliably with a cursor.

The problem that the present invention attempts to solve is as stated above, and the means for solving this problem, and the effect thereof, will now be described.

A first aspect of the present invention provides an echo display device with the following configuration. Specifically, this echo display device comprises a display component, a cursor manipulation component, and a controller. The display component is configured to display an echo screen in real time based on echo information inputted from an echo detection device. The cursor manipulation component is configured to manipulate a cursor displayed on the echo screen. The controller is configured to control the display component so as to display the cursor on the echo screen. The controller includes an echo display position acquisition component and a cursor display position determination component. The echo display position acquisition component is configured to acquire in real time an echo display position that is the display position of an echo on the echo screen. The cursor display position determination component is configured to determine a cursor display position that is the display position of the cursor on the echo screen, based on manipulation of the cursor manipulation component. When the cursor display position after the cursor has moved by manipulation of the cursor manipulation component is a movement determination position, the cursor display position determination component is configured to move the cursor display position to the echo display position when the echo display position is within a specific range from the movement determination position, or when the movement determination position is within a specific range from the echo display position.

Consequently, the cursor display position can be automatically matched to echoes that have various sizes, shapes, and positions, and whose position, size, and so forth vary in real time. Therefore, a particular echo can be easily designated with a cursor on an echo screen on which various echoes are changing in a complex fashion.

The above echo display device is preferably configured as follows. Specifically, the controller includes a cursor movement orientation detector configured to detect the movement orientation of the cursor. The cursor display position determination component is configured to move the cursor display position to the echo display position with the orientation closest to the movement orientation of the cursor detected by the cursor movement orientation detector, as seen from the movement determination position, when a plurality of echo display positions are within a specific range from the movement determination position, or when the movement determination position is within a specific range from the plurality of the echo display positions.

Consequently, even if the cursor is moved to a portion where a plurality of echoes are displayed close together, the intent of the user can be surmised based on the movement orientation of the cursor having arrived at the movement determination position, allowing the cursor display position to be matched to the echo with the highest probability of being the one the user wants. Therefore, cursor manipulation is more intuitive.

The above echo display device is preferably configured as follows. Specifically, the controller is configured to produce a list of echoes, arranged in order, when a plurality of echo display positions are within a specific range from the movement determination position, or when the movement determination position is within a specific range from a plurality of the echo display positions. The cursor display position determination component is configured to successively switch the echo that is the destination of the cursor display position, according to the list, and in response to user manipulation.

Consequently, when the cursor is moved to a portion where a plurality of echoes are displayed close together, the echo that is the destination of the cursor movement can be determined by an explicit manipulation on the part of the user. Therefore, the cursor can be prevented from moving to an echo that is not the intent of the user.

With the above echo display device, it is preferable if the cursor display position determination component is configured to cause the cursor display position to follow the movement of the echo display position when the echo display position has moved after the cursor display position is moved to the echo display position.

Consequently, even if an echo moves after the cursor display position has been moved to that echo, there will be no need to match the cursor to the echo again. Therefore, ease of manipulation can be further enhanced.

The above echo display device is preferably configured as follows. Specifically, the controller further includes a cursor movement speed detector configured to detect the movement speed of the cursor. The cursor display position determination component is configured to set the cursor display position as the movement determination position when the movement speed of the cursor detected by the cursor movement speed detector is below a specific value.

Consequently, if the cursor is being moved a lot, it can be prevented from moving to a nearby echo, and at the same time the cursor can be held still near the intended echo, which allows the cursor to be moved to this echo.

The above echo display device is preferably configured as follows. Specifically, the cursor display position determination component is configured to set an echo detection range using the movement determination position as a reference. The cursor display position determination component is configured to move the cursor display position to the echo display position when the echo is within the echo detection range.

Consequently, whether or not to move the cursor display position to an echo can be determined by simple processing of determining whether or not an echo is within a range set using the cursor as a reference.

With the above echo display device, it is preferable if the profile of the echo detection range is set to vary based on at least one of the movement speed and the movement orientation of the cursor.

Consequently, the cursor display position can be moved to an echo according to the intent of the user's cursor manipulation by flexibly varying the echo detection range according to the movement status of the cursor.

The above echo display device is preferably configured as follows. Specifically, the cursor display position determination component is configured to set a cursor detection range using the echo display position as a reference. The cursor display position determination component is configured to move the cursor display position to the echo display position when the movement determination position is within the cursor detection range.

Consequently, whether or not to move the cursor display position to an echo is determined based on whether or not the cursor is within a range set using each echo as a reference, so processing for moving the cursor display position to an echo can be performed flexibly according to the characteristics of each individual echo.

With the above echo display device, it is preferable if the profile of the cursor detection range is set to vary based on the size of the echo.

Consequently, the proper cursor detection range can be set according to the size of an echo, and the cursor can be easily matched up with an echo.

With the above echo display device, it is preferable if the profile of the cursor detection range is set to bulge out of the profile of the echo more for a smaller echo than for a large echo.

Consequently, it will be particularly easy to match up the cursor to small echoes, to which it is usually difficult to match up the cursor.

With the above echo display device, it is preferable if the profile of the cursor detection range is set to vary based on at least one of the movement speed and the movement orientation of the cursor.

Consequently, a cursor detection range that is suited to the movement status of an echo can be set, so regardless of whether an echo is barely moving or is moving a lot, the cursor display position can be easily matched up to the echo display position of that echo.

With the above echo display device, it is preferable if the cursor detection range of each of the echoes is set so as not to include other echoes.

Consequently, this prevents a cursor that is superposed over a certain echo from automatically moving to another echo.

With the above echo display device, it is preferable if the cursor detection ranges of a plurality of the echoes are set so as not to overlap each other.

Consequently, even if the cursor is moved to a region where a plurality of echoes are close together, since the cursor detection ranges do not overlap each other, it will be easy to determine the echo that is the destination of the cursor.

A second aspect of the present invention provides the following cursor movement control method that is used with an echo display device that includes a display component and a cursor manipulation component. The display component is configured to display an echo screen in real time based on echo information inputted from an echo detection device. The cursor manipulation component is configured to be manipulated to move a cursor displayed on the echo screen. This cursor movement control method comprises an echo display position acquisition step, a cursor display position determination step, and a display step. In the echo display position acquisition step, an echo display position that is the display position of an echo on the echo screen is acquired in real time. In the cursor display position determination step, a cursor display position that is the display position of the cursor on the echo screen is determined based on manipulation of the cursor manipulation component. In the display step, the cursor is displayed at the cursor display position on the echo screen. In the cursor display position determination step, when the cursor display position after the cursor has moved by manipulation of the cursor manipulation component is a movement determination position, the cursor display position is moved to the echo display position when the echo display position of the echo is within a specific range from the movement determination position, or when the movement determination position is within a specific range from the echo display position of the echo.

Consequently, the cursor display position can be automatically matched to echoes that have various positions, sizes, and shapes, and whose positions, sizes, and so forth vary in real time. Therefore, on an echo screen where various echoes are changing in a complex fashion, a particular echo can be easily designated with a cursor.

BRIEF DESCRIPTION OF THE DRAWINGS

Referring now to the attached drawings which form a part of this original disclosure.

DETAILED DESCRIPTION OF EMBODIMENTS

Figure 1:
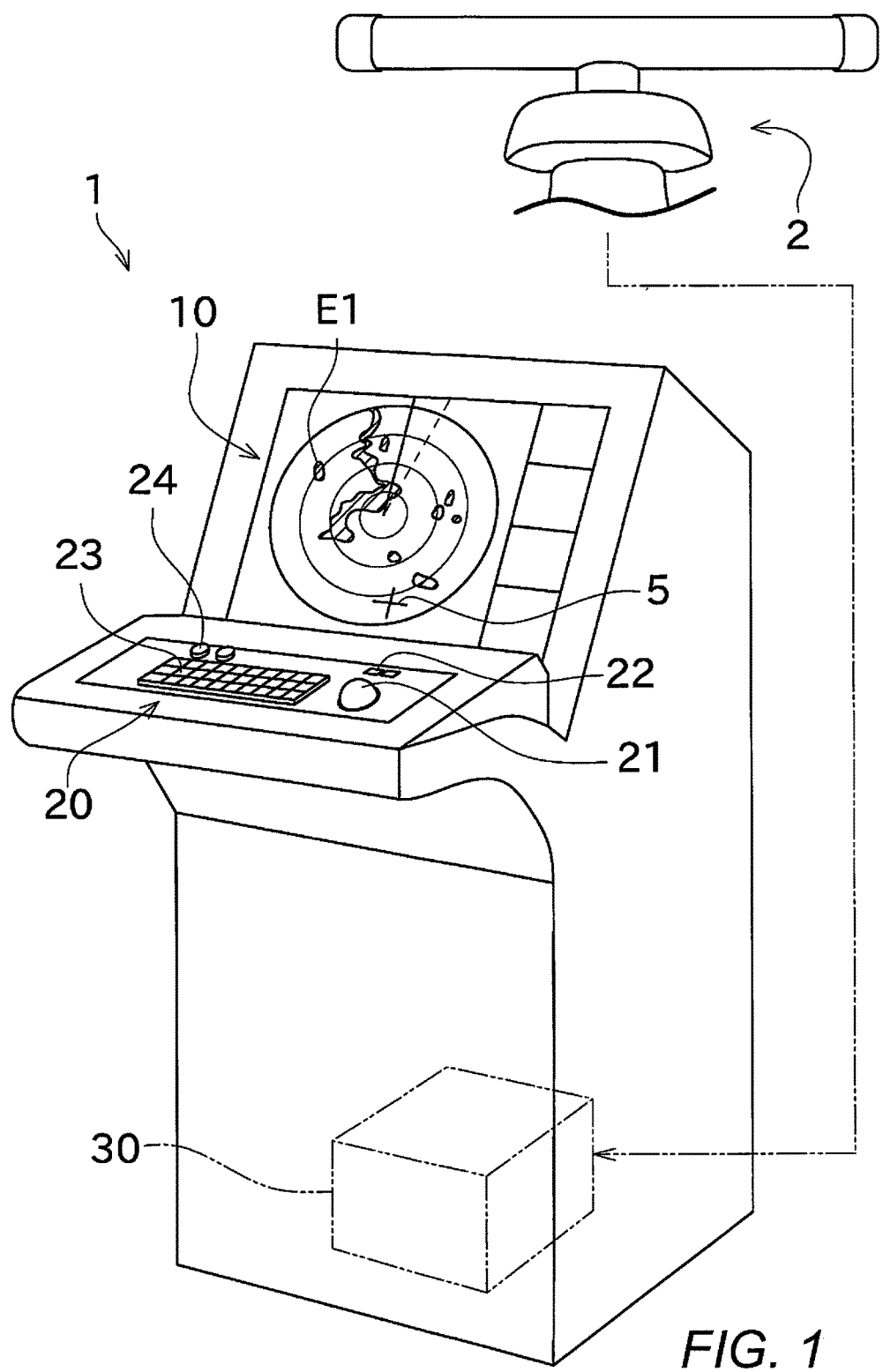
FIG. 1 is a simplified oblique view of the configuration of an information display device pertaining to an embodiment of the present invention.
Figure 2:
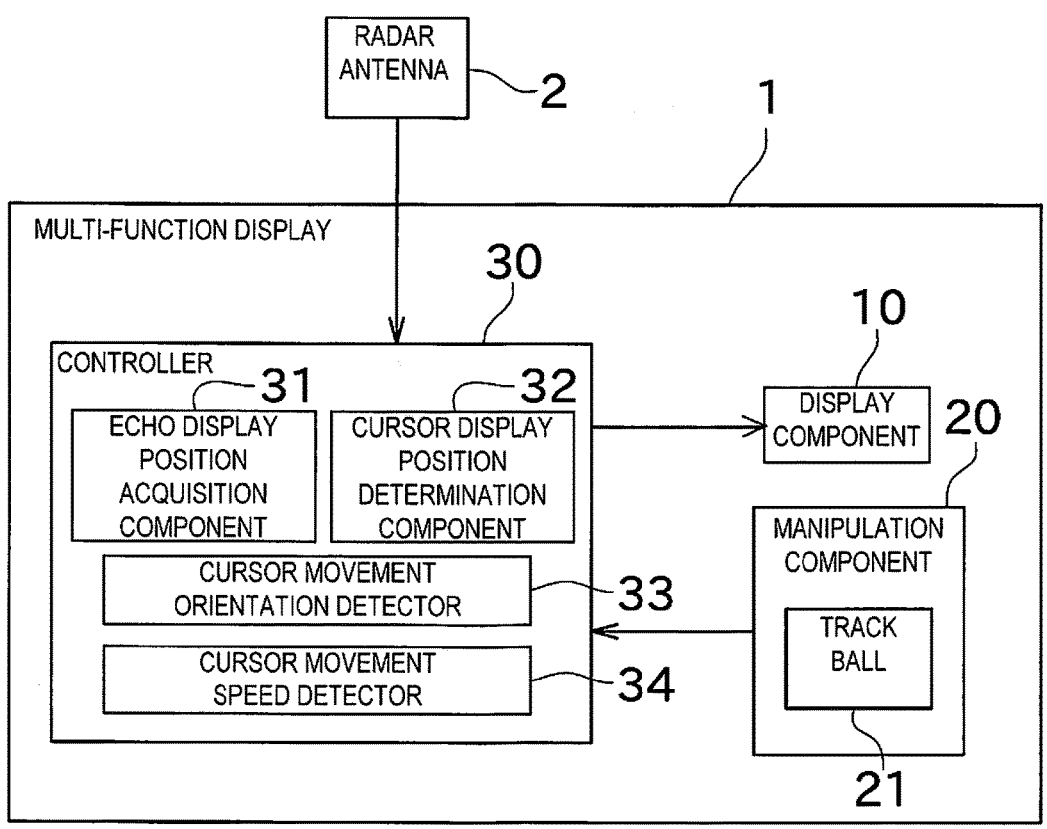
FIG. 2 is a functional block diagram of the electrical configuration of the information display device in this embodiment.

An embodiment of the present invention will now be described through reference to the drawings. FIG. 1 is a simplified oblique view of the configuration of an information display device 1 pertaining to an embodiment of the present invention. FIG. 2 is a functional block diagram of the electrical configuration of the information display device 1 in this embodiment.

The information display device (echo display device) 1 in this embodiment is capable of displaying various kinds of information related to a ship. This information display device 1 can display, in real time, a radar echo (echo information) acquired from a radar antenna (echo detection device) 2, on a display component 10 so that it can be checked by the user.

The radar antenna 2 is electrically connected to the information display device 1. This radar antenna 2 is configured so that it can rotate 360° in a horizontal plane, and can scan for other ships, islands, and other such targets around its own ship. The radar antenna 2 sends out highly directional electromagnetic waves, and receives reflected waves from various targets, thereby acquiring information about the targets, and outputs the obtained information to the information display device 1. The information display device 1 is able to produce a radar image by finding the target distance, size, and bearing based on information from the radar antenna 2, and to display this image on the display component 10.

The information display device 1 has the above-mentioned TT function, and is able to calculate and display movement direction, speed, and so forth for echoes of a moving target (including echoes specially designated by the user).

The detailed configuration of the information display device 1 will now be described. As shown in FIG. 1, the information display device 1 comprises the display component 10, a manipulation component 20, and a controller 30.

The display component 10 is constituted by a liquid crystal display or the like, and is able to display a radar image (echo image) that shows the above-mentioned radar echoes, according to manipulation by the user.

The manipulation component 20 is disposed near the display component 10, and is constituted by a track ball (cursor manipulation component) 21, a button 22, a keyboard 23, a dial 24, and so forth. The user can use the manipulation component 20 to perform various designations on the information display device 1.

The track ball 21 is a pointing device that is manipulated to move a cursor 5 displayed on the display component 10. The track ball 21 has a ball that is rotated by the fingers of the user of the information display device 1, allowing the cursor 5 to be moved according to the rotational direction and speed of the ball.

As shown in FIG. 1, the controller 30 is configured as a computer that is built into the information display device 1. As shown in FIG. 2, the controller 30 comprises an echo display position acquisition component 31, a cursor display position determination component 32, a cursor movement orientation detector 33, and a cursor movement speed detector 34.

To describe this in more specific terms, the controller 30 comprises a CPU or other such operation component, and a memory component consisting of a ROM, a RAM, etc. The memory stores a cursor movement control program for controlling the cursor 5 displayed on the display component 10. The above-mentioned hardware and software work together to allow the controller 30 to operate as the echo display position acquisition component 31, the cursor display position determination component 32, the cursor movement orientation detector 33, the cursor movement speed detector 34, etc.

The echo display position acquisition component 31 analyzes the radar echoes inputted from the radar antenna 2, thereby calculating and acquiring the positions where these echoes are displayed on the radar image in real time. Consequently, the echo information displayed on the display component 10 is constantly updated in real time, so changes in the environment around the ship, the movement of other ships, and other such display information can be faithfully reflected. Also, the controller 30 has the function of automatically matching up the position of the cursor 5 with the position of an echo (discussed in detail below), and the latest status can be reflected for the position of the echo to which the position of the cursor 5 is matched.

The cursor display position determination component 32 detects manipulation of the track ball 21 and determines the cursor display position, which is the position where the cursor 5 is displayed in the radar image. More specifically, when the user rolls the ball of the track ball 21, the cursor display position determination component 32 changes the position of the cursor 5 according to the orientation and speed of the rolling ball, and thereby determines the new cursor display position.

The cursor movement orientation detector 33 can detect the movement orientation of the cursor by analyzing the movement history of the cursor 5. More specifically, the cursor movement orientation detector 33 is configured to be able to store the immediately prior cursor position, and acquires the current movement orientation of the cursor 5 by calculation based on the positional relation between the current cursor position and the past cursor position. The above is not the only option, however, and the configuration can, for example, be that the movement orientation of the cursor 5 is found from the orientation of the rolling of the ball in the track ball 21.

The cursor movement speed detector 34 detects the movement speed of the cursor resulting from manipulation by the user. In this embodiment, the cursor movement speed detector 34 detects whether the user is still manipulating the cursor or the cursor manipulation has ended. More specifically, it is determined that the cursor is being manipulated if the movement speed of the cursor 5 is over a specific value, and it is determined that the cursor manipulation has ended if the movement speed of the cursor 5 is at or below a specific value (nearly zero).

The cursor automatic movement processing performed by the cursor display position determination component 32 of the information display device 1 in this embodiment will now be described through reference to FIGS. 3 to 9.

Figure 3:
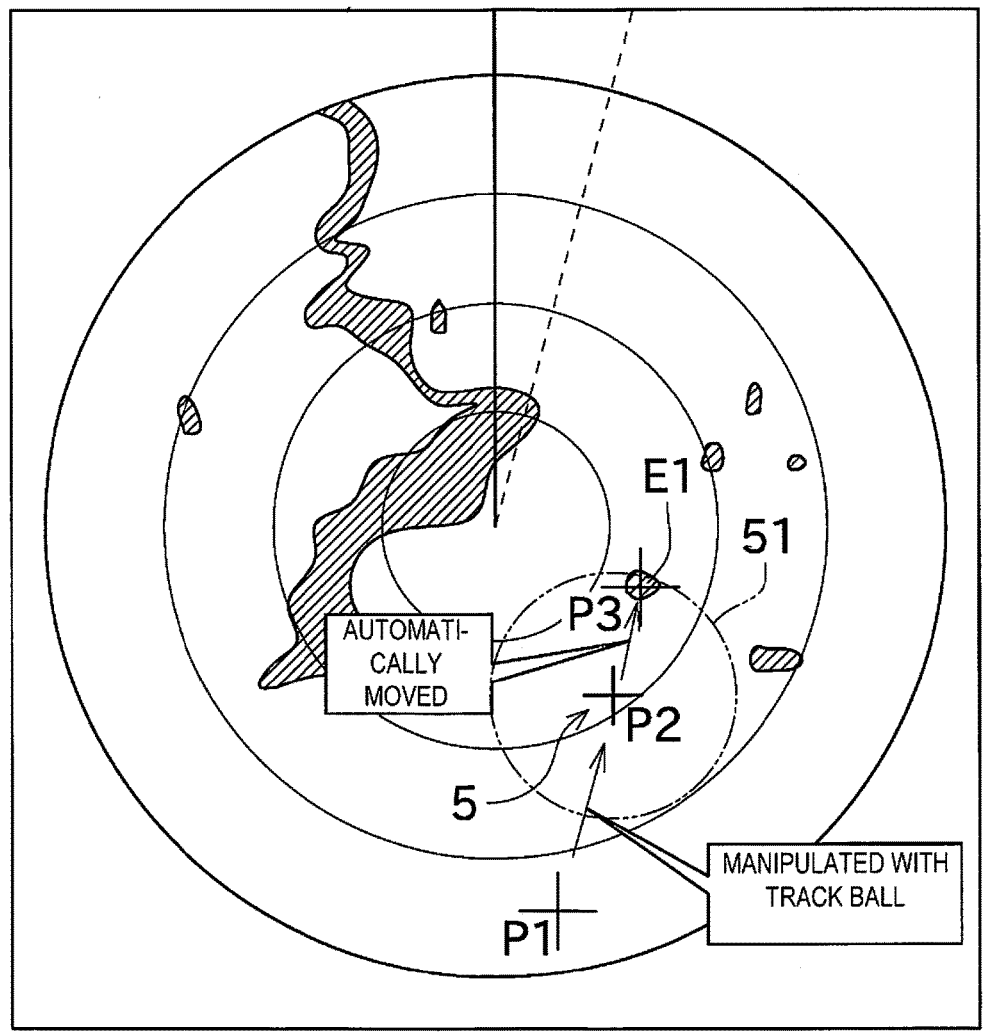
FIG. 3 shows how the position of a cursor manipulated with a track ball is automatically matched to an echo.

Let us consider a case in which the user wants to designate something, in a situation in which the radar image shown in FIG. 3 is being displayed on the display component 10, and a particular echo E1 that appears in a radar image is the object. For example, what is designated by the information display device 1 may be the tracking of an echo by the above-mentioned TT function. In this case, the user manipulates the track ball 21 to move the cursor 5 from the position P1 shown in FIG. 3 to a position that overlaps the echo E1 (such as the position P3), and in this state the button 22 needs to be pressed, for example. However, rocking of the ship may cause the user's hand to be unsteady, making it difficult to do the above-mentioned cursor manipulation. Also, it is possible that the display of the echo E1 is small because the target is itself small, and furthermore, the radar image that includes the echo E1 changes from moment to moment in real time. Therefore, it can be difficult to move the cursor 5 and accurately match it up with the echo E1.

With this in mind, the cursor display position determination component 32 provided to the information display device 1 in this embodiment determines the position of the cursor 5 as discussed above, the positional relation between the position of the cursor 5 after it has been moved by manipulation of the track ball 21 (hereinafter sometimes referred to as the "movement determination position") and the positions of the various echoes is monitored, and if it is detected that the position of the cursor 5 is close to a certain echo, the position of the cursor 5 can be automatically moved to the display position of that echo. This processing will herein sometimes be called "cursor automatic movement processing." Consequently, the user does not have to match up the display position of the cursor 5 exactly with the echo E1. That is, the user merely needs to move the cursor 5 from the position P1 to a position near the echo E1 (such as the position P2), and the cursor 5 will automatically be moved to the position P3 that coincides with the display position of the echo E1.

The following two methods, described below, are examples of processing to achieve automatic movement (correction) of the position of the cursor 5 as discussed above.

The first method will be described through reference to FIGS. 3 to 6. In this first method, an echo detection range 51 is set using the display position of the cursor 5 as a reference, and if an echo is present within this echo detection range 51, the position of the cursor 5 is made to coincide with the position of that echo. FIG. 3 shows the echo detection range 51 set to be centered on the cursor 5 at the position P2. This echo detection range 51 is established inside the controller 30, and is not actually displayed on the display component 10.

In the example in FIG. 3, the echo detection range 51 is defined as a circular range, but may have any shape, such as rectangular. It is preferable for the echo detection range 51 to be circular or rectangular because whether or not an echo is within the echo detection range 51 can be determined by simple processing in which the coordinates of the cursor 5 and the coordinates of the echo (more specifically, the echo display position acquired by the echo display position acquisition component 31) are used in the calculation.

Incidentally, if the above-mentioned cursor automatic movement processing is executed every time the user moves the cursor 5, there is the risk that the cursor 5 will jump to an unintended echo in the course of moving the cursor 5, which means that manipulation performance will actually suffer. To prevent this, the controller 30 of the information display device 1 is configured so that cursor automatic movement processing is performed, using the position of the cursor 5 as the above-mentioned movement determination position, only when the movement speed of the cursor 5 detected by the cursor movement speed detector 34 is at or below a specific value (more specifically, when the movement speed of the cursor 5 is substantially zero, and it is determined that cursor manipulation has ended). Consequently, the position of the cursor 5 will not jump to a nearby echo while the cursor 5 is being moved, so good manipulation performance can be maintained. On the other hand, if the user moves the cursor 5 and stops it near the echo E1 that is to be designated (such as at the position P2), cursor automatic movement processing is performed so that the position of the cursor 5 can be easily and accurately matched to the position P3 that coincides with the echo E1.

Figure 4:
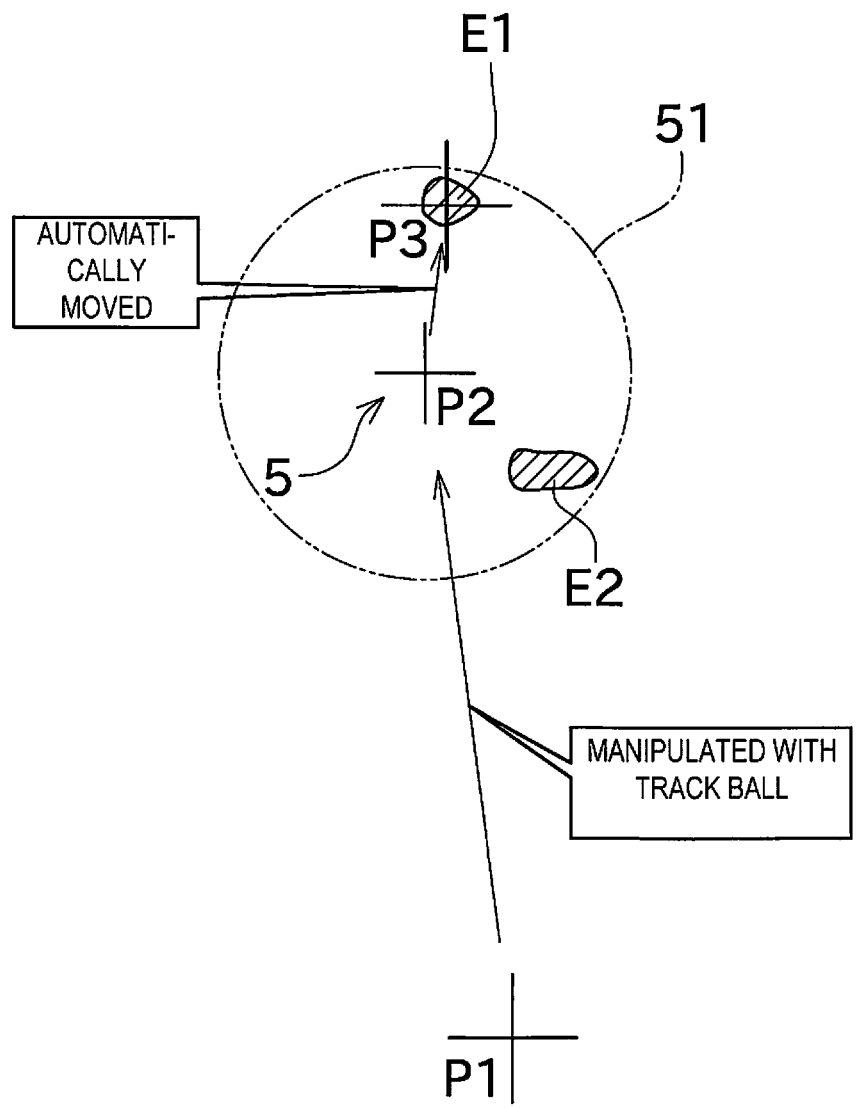
FIG. 4 shows an example of the processing when a plurality of echoes are present in an echo detection range set using the position of the cursor as a reference.

The above example is for when a single echo E1 enters the echo detection range 51, but if echoes mix together in the display, for example, it is conceivable that a plurality of echoes will be present in the above-mentioned echo detection range 51. FIG. 4 shows a detail view of an example in which two echoes E1 and E2 are in the echo detection range 51. In this case, the controller 30 of the information display device 1 further comprises the cursor movement orientation detector 33 to decide which of the plurality of the echoes E1 and E2 should be matched to the display position of the cursor 5. At the point when the user stops the cursor 5, the cursor movement orientation detector 33 detects the orientation in which the cursor 5 was moved up to that point, and outputs the result to the cursor display position determination component 32.

FIG. 4 shows a situation in which the cursor 5 has been moved from the position P1 and stopped at the position P2. If the cursor movement speed detector 34 detects that the movement speed of the cursor 5 has dropped substantially to zero, the cursor movement orientation detector 33 detects the orientation in which the cursor 5 was moved until reaching the position P2 (the movement determination position), from the transition in the past position of the cursor 5. The cursor display position determination component 32 then automatically moves the position of the cursor 5 to the echo located in the orientation closest to the detected movement orientation of the cursor 5, using the position P2 where the cursor 5 has stopped as a reference.

In the example in FIG. 4, the cursor movement orientation detector 33 detects that the cursor 5 has moved nearly directly over the position P2 by the time reaches this point. Therefore, the cursor display position determination component 32 selects the echo E1 that is located nearly directly over, rather than the echo E2 located to the lower right, as seen from the position P2 of the cursor 5 (the movement determination position), and makes the display position of the cursor 5 coincide with the echo E1. As a result, the cursor 5 moves automatically to the position P3.

Thus, the information display device 1 in this embodiment can surmise the intent of the user based on the orientation in which the cursor 5 is moved by manipulation by the user, and can thereby match the display position of the cursor 5 to the echo E1, which is the most likely to be the one desired by the user. Therefore, even when echoes are displayed close together, the user can match the cursor to the desired echo by an intuitive manipulation.

Figure 5:
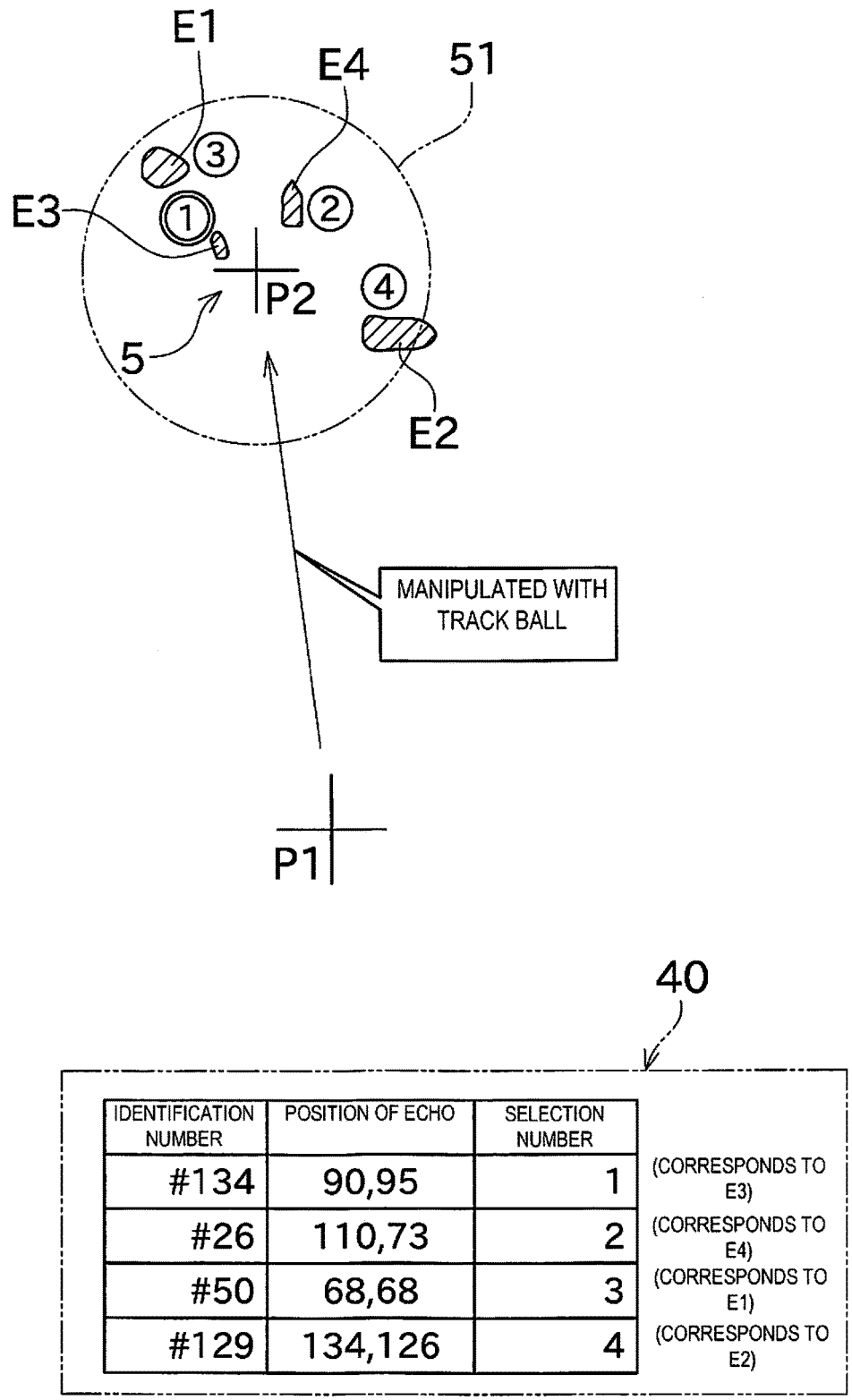
FIG. 5 shows another example of the processing when a plurality of echoes are present in the echo detection range.

However, the configuration can also be such that the echo desired by the user is explicitly selected. An example of this is shown in FIG. 5. In the example in FIG. 5, four echoes E1, E2, E3, and E4 are present in the interior of the echo detection range 51 defined using the cursor 5 in the position P2 as a reference. In this case, the cursor display position determination component 32 produces a list 40 in which the echoes present in the interior of the echo detection range 51 are listed in order, starting with the one closest to the position P2 where the cursor 5 was stopped. This list 40 includes identification numbers for uniquely identifying each echo, the positions (coordinates) of the echoes, and selection numbers that are assigned automatically in order to select those echoes. As discussed above, since the echoes are listed in the list 40 in order starting from the one closest to the position P2 of the cursor 5, the order in the list 40 is the echo E3, the echo E4, the echo E1, and the echo E2. This list 40 is produced inside the controller 30, and is not actually displayed on the display component 10.

The cursor display position determination component 32 displays the above-mentioned selection numbers assigned to the echoes E1, E2, E3, and E4 based on the above-mentioned list 40, with the display being close to these echoes. FIG. 5 shows an example in which selection numbers are assigned, starting with number 1 given to the one closest to the position P2 of the cursor 5, and these selection numbers are displayed as circled numerals. In the initial state, the selection number "1" corresponding to the echo E3 that is closest to the position of the cursor 5 is highlighted in its display, and when the user briefly presses and releases the button 22 in this state, the position of the cursor 5 moves to the echo E3 to which this selection number "1" has been assigned. On the other hand, if the user holds down the button 22, the highlighted selection number changes from "1" to "2," "3," "4," "1," and so on cyclically at specific time intervals. If the user releases the button 22 at the timing at which the selection number of the desired echo is highlighted, the position of the cursor 5 moves to the echo corresponding to that selection number. Thus, the echo to which the position of the cursor 5 is to be matched can be switched according to the list order by manipulation by the user. With this configuration, even if numerous echoes are grouped close together, the echo to which the cursor 5 is to be moved can be determined by an explicit manipulation by the user. Therefore, the cursor 5 can be prevented from moving to an echo that is not intended by the user.

With the above list 40, the four echoes E1, E2, E3, and E4 are arranged in order starting from the one that is the shortest distance from the cursor 5 (the position P2). However, how the echoes are listed in the list 40 is not limited to this. For example, the orientation in which the cursor 5 has moved may be detected by the cursor movement orientation detector 33 in the same manner as above, and the echoes E1, E2, E3, and E4 may be arranged in order starting with the orientation that is closest to the detected movement orientation of the cursor 5 as seen from the position P2.

In the above example, the cursor automatic movement processing is performed at the point when the cursor 5 is stopped. That is, the cursor automatic movement processing is not performed while the cursor 5 is being manipulated with the track ball 21. Instead of this, however, the cursor automatic movement processing may be performed constantly, even during manipulation of the cursor 5 with the track ball 21, so that the size of the echo detection range 51 can be flexibly changed according to the situation.

Figure 6:
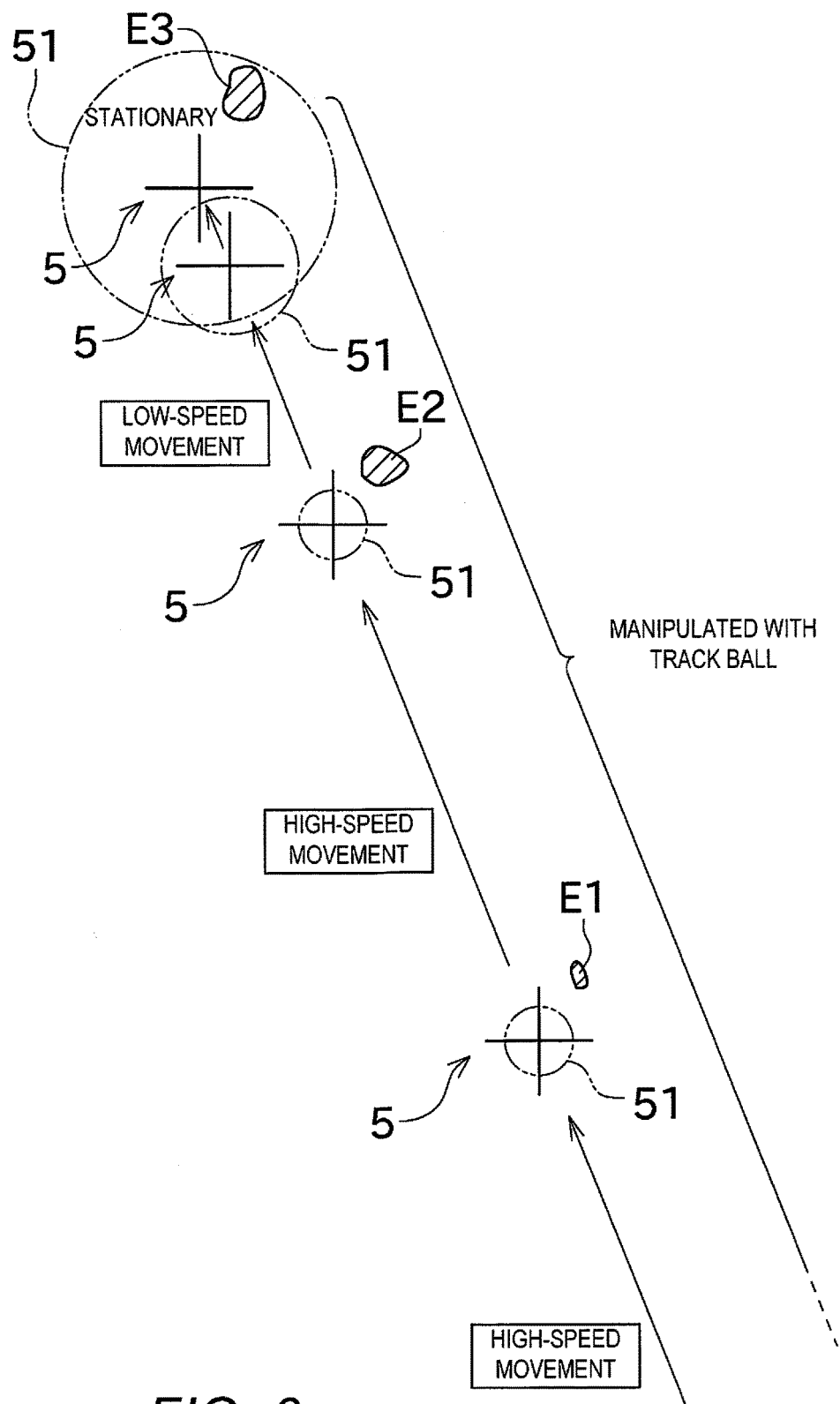
FIG. 6 shows how the echo detection range varies according to the movement speed of the cursor.

FIG. 6 shows an example of varying the size of the echo detection range 51 according to the movement speed of the cursor 5. In FIG. 6, not only the position where the cursor 5 has stopped, but also the position of the cursor 5 when it is being moved by manipulation of the track ball 21 become the above-mentioned movement determination position. In the example in FIG. 6, the echo detection range 51 becomes smaller when the cursor 5 is moving at a higher speed, and the echo detection range 51 becomes larger when the cursor is stopped or moving at a lower speed. Therefore, when the cursor 5 is being moved at a high speed, the cursor position will not jump to the nearby echoes E1 and E2, and when the cursor 5 is eventually slowed down and stopped, it will be matched automatically to the position of the echo E3 near the stopped position. Thus, the display position of the cursor 5 can be moved to the echo E3 according to the cursor manipulation intended by the user.

Figure 7:
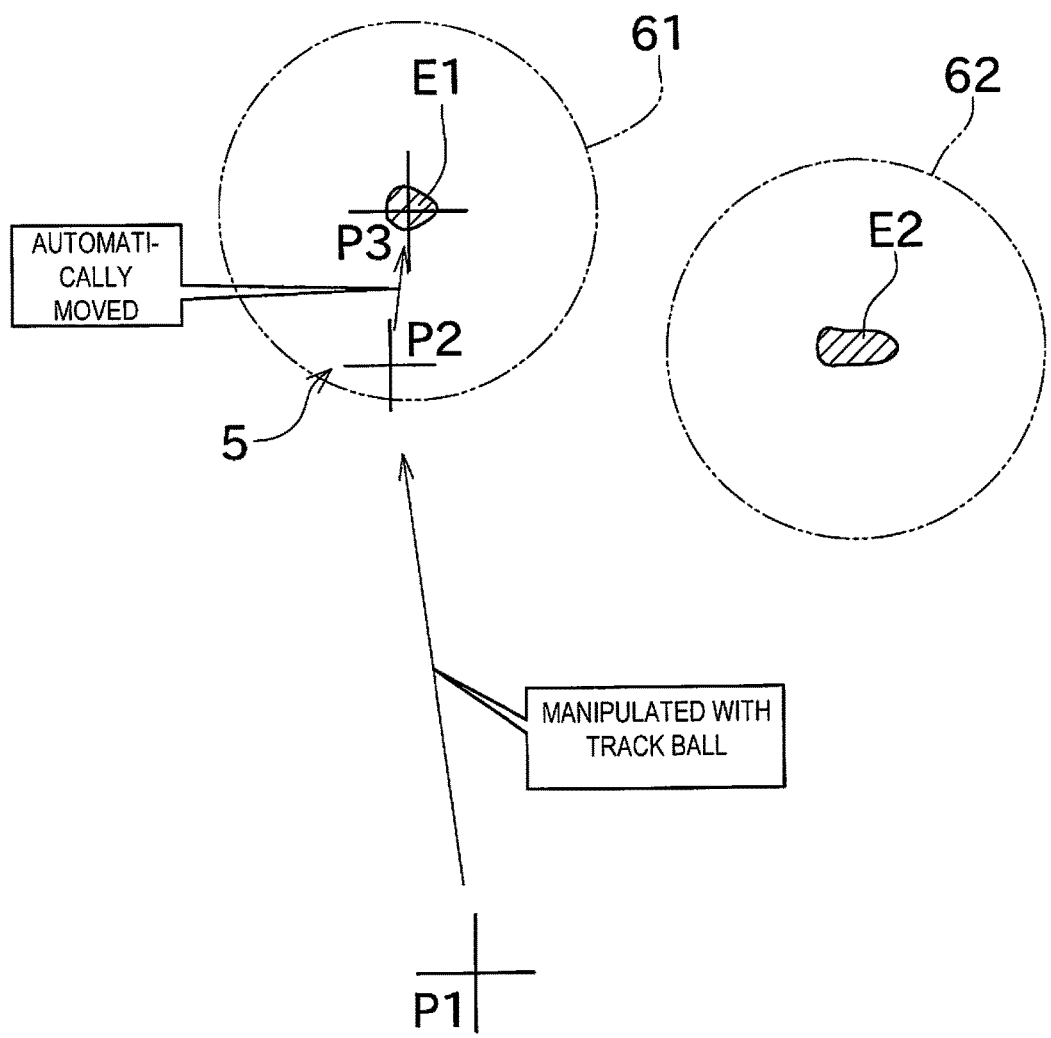
FIG. 7 shows a cursor detection range set using the position of an echo as a reference.

The second method will now be described through reference to FIGS. 7 and 8. With this method, rather than setting the echo detection range 51 by using the cursor 5 as a reference, cursor detection ranges 61 and 62 are set using the echoes E1 and E2, respectively, as a reference, as shown in FIG. 7. Upon detecting that the determined position P2 of the cursor 5 (the above-mentioned movement determination position) has entered the cursor detection range of one of the echoes, the cursor display position determination component 32 automatically moves the display position of the cursor 5 to the position P3 so as to make the display position of the cursor 5 coincide with the position P of the echo E1 corresponding to the cursor detection range 61.

With this second method, the cursor 5 can be properly matched up with echoes under many different situations by flexibly setting the cursor detection range 61 for each individual echo. FIG. 8 shows an example of the cursor detection ranges 61 to 68 set for the various echoes E1 to E8. This will be described in detail below.

Figure 8:
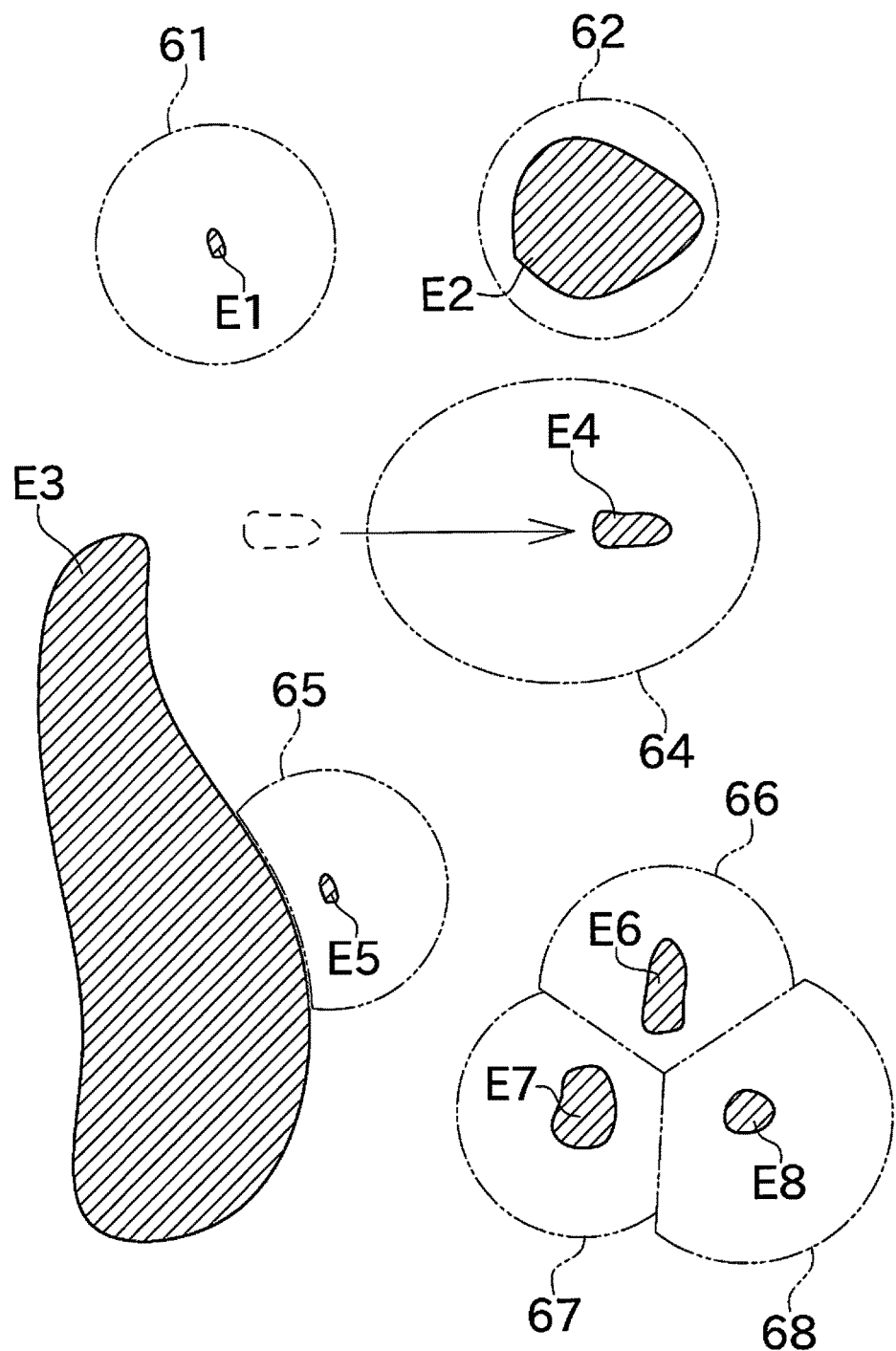
FIG. 8 shows an example of setting the cursor detection range according to each echo.

As will be seen from a comparison of the echo E1 and the echo E2 in FIG. 8, for the echo E1 that is smaller in size, the profile of the cursor detection range 61 is set to bulge out more than the profile of the echo E1, and for the echo E2 that is larger in size, the profile of the cursor detection range 62 is set not to bulge out very much from the profile of the echo E2. Consequently, it will be particularly easy to match up the cursor 5 to the smaller echo E1, which would otherwise make it more difficult to match up the cursor 5. Also, for a larger echo, since it is easy to match up the cursor 5, it is possible not to set a cursor detection range (in other words, for the automatic movement of the cursor to be nullified) for echoes that are larger than a specific size, such as the echo E3.

As indicated by the arrow, with the echo E4 shown in FIG. 8, the display screen is moved laterally. It is possible that this will result in setting the cursor detection range 64 of the echo E4 to a shape that is slender (such as an ellipse) and extends rearward in the direction in which the echo E4 is moving. This elliptical shape preferably becomes even more slender as the movement speed of the echo E4 increases. By thus changing the profile of the cursor detection range 64 based on the movement speed or movement orientation of an echo, the position of the cursor 5 can be easily matched to the echo E4 even when the echo E4 that is moving at high speed is followed from the rear with the cursor 5.

The echo E5 shown in FIG. 8 is adjacent to the large echo E3. In this case, the cursor detection range 65 of this echo E5 is established so as not to include the larger echo E3. Doing this prevents the cursor 5 from automatically moving to the other echo E5 in a situation in which the user wants to designate the large echo E3 and the cursor 5 is overlapping the echo E3.

The three echoes E6, E7, and E8 shown in FIG. 8 are all next to one another. The respective cursor detection ranges 66, 67, and 68 of the echoes E6, E7, and E8 do not bulge out very much to the side closer to the adjacent echoes, but bulge out more to the side that is away from the adjacent echoes, and this sets the cursor detection ranges 66, 67, and 68 so that they do not overlap one another. Consequently, the cursor display position determination component 32 can easily determine the object to which the display position of the cursor 5 is to be automatically matched.

In the example in FIG. 8, the cursor detection ranges 61 to 68 do not overlap each other, but may instead be set so that they do overlap each other. If the cursor 5 is moved to a portion where a plurality of cursor detection ranges overlap, the echo to which the cursor 5 is to be automatically moved can be determined according to the orientation in which the cursor was moved just as in FIG. 4, or can be explicitly selected by the user just as in FIG. 5.

Two methods for automatically matching up the position of the cursor 5 to the position of an echo were described above, and which method is employed can be freely determined by taking the intended application of the device and so forth into account. With the first method (FIG. 3), the echo detection range 51 is set around the cursor 5, and whether or not the echo E1 enters this range is determined, and this allows the processing to be simplified. With the second method (FIG. 7), the cursor detection ranges 61 and 62 can be flexibly established according to the characteristics of the respective echoes E1 and E2, so ease of manipulation can be effectively enhanced as dictated by the situation.

Figure 9:
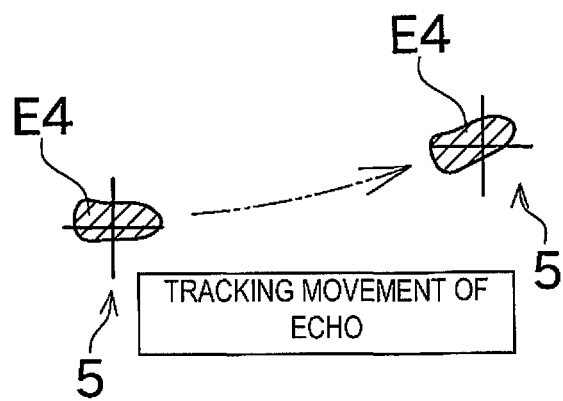
FIG. 9 shows how a curse matched to the position of an echo moves along with the movement of the echo.

The cursor display position determination component 32 monitors the movement of an echo after matching up the position of the cursor 5 to the position of the echo, and changes the display position of the cursor 5 in real time so that it always coincides with the display position of that echo. Therefore, as shown in FIG. 9, for example, after the display position of the cursor 5 is first matched to the echo E4, the cursor 5 tracks the movement of the position of the echo E4. This tracking of the echo E4 with the cursor 5 is continued until the echo E4 disappears, or the echo E4 goes outside of the radar image, or the user starts manipulating the track ball 21. Consequently, even if the echo E4 moves right away after the cursor 5 is matched to it, there is no need to manipulate the track ball 21 and match up the cursor 5 again, so the echo E4 can be designated more easily.

As described above, the information display device 1 in this embodiment comprises the display component 10, the track ball 21, and the controller 30. The display component 10 displays a radar image in real time based on echo information inputted from the radar antenna 2. The track ball 21 is manipulated to move the cursor 5 displayed in the radar image. The controller 30 controls the display component 10 so as to display the cursor 5 in the radar image. The controller 30 comprises the echo display position acquisition component 31 and the cursor display position determination component 32. The echo display position acquisition component 31 acquires in real time an echo display position, which is the display position of an echo in the radar image. The cursor display position determination component 32 determines a cursor display position, which is the position where the cursor 5 is displayed in the radar image, based on manipulation of the track ball 21. When the movement determination position is the position P2 after the cursor 5 has been moved by manipulation of the track ball 21, the cursor display position determination component 32 moves the display position of the cursor 5 to the position P3 to make it coincide with the display position of the echo E1 if the display position of the echo E1 is within the echo detection range 51, which is a specific range from the movement determination position (the position P2), as in FIG. 3. Alternatively, if the movement determination position (the position P2) is within the cursor detection range 61, which is a specific range from the display position of the echo E1, as in FIG. 7, the cursor display position determination component 32 moves the display position of the cursor 5 to the position P3 to make it coincide with the display position of the echo E1.

Consequently, the display position of the cursor 5 can be automatically matched up with echoes of various size, shape, and position, and whose position, size, and so forth change in real time. Therefore, in a radar image in which various echoes are changing in a complex fashion, manipulation for designating a particular echo E1 by the cursor 5 will be easy.

A preferred embodiment of the present invention was described above, but the above configuration can be modified as follows, for example.

In the above embodiment, automatic cursor movement processing is performed by bringing the cursor 5 to a halt. Alternatively, automatic cursor movement processing may be performed constantly, regardless of whether the cursor 5 is moving or still. However, the configuration is not limited to what is given above, and it is also possible to provide a special switch, for example, to the manipulation component 20, so that the automatic cursor movement processing is performed by manipulating this switch.

The cursor 5 is not limited to the track ball 21, and can be configured so that it is manipulated by a mouse, a joystick, a touch pad, or the like. The cursor 5 may also be manipulated with arrow keys (discussed below).

In the above embodiment, the user designated an echo in order to use the TT function, but the automatic cursor movement function is not limited to a TT function, and can be widely utilized whenever a particular echo in a radar image needs to be designated.

In the above embodiment, a configuration was disclosed in which the position of the cursor 5 was moved automatically, but as a modification example, a configuration is also possible in which the display position of the cursor 5 is fixed in the center of the screen, and the entire radar image in which an echo appears is scrolled, so that in essence the cursor display position is moved to the echo.

Figure 10:
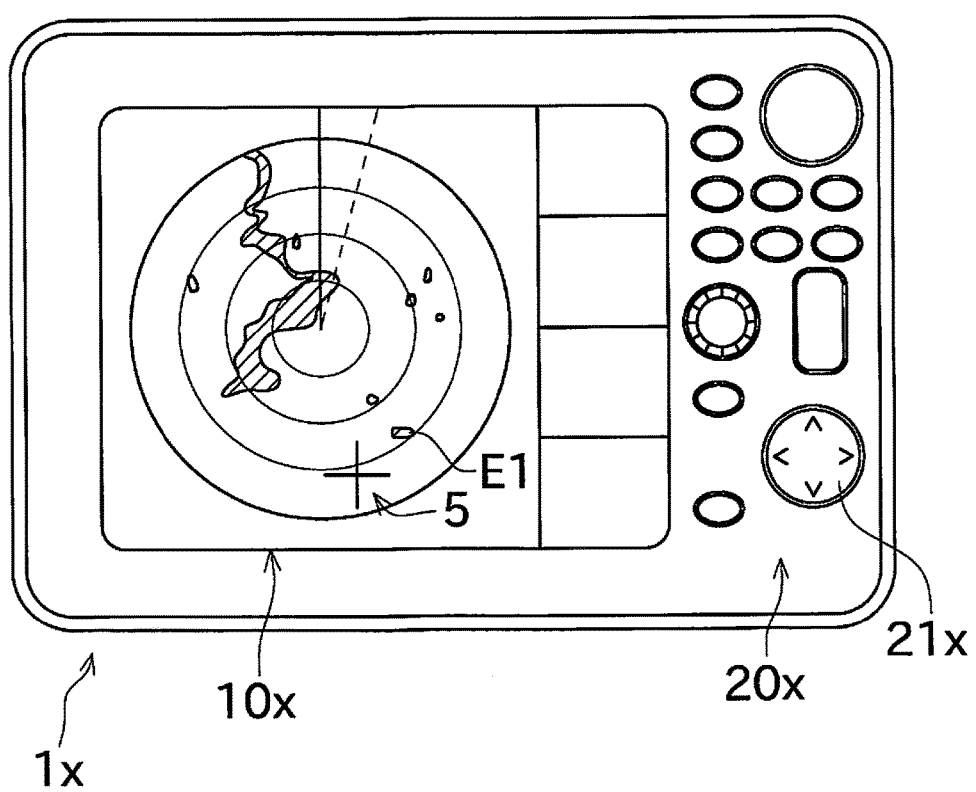
FIG. 10 is a front view of the information display device pertaining to another example.

The present invention is not limited to the information display device 1 configured as shown in FIG. 1, and can also be applied to a small information display device 1x such as that shown in FIG. 10. The information display device 1x in the example in FIG. 10 comprises a display component 10x and a manipulation component 20x. The manipulation component 20x comprises an arrow key 21x for manipulating the cursor 5.

The echo display device of the present invention can also be configured as a dedicated radar information display device that is connected to a radar antenna, or it can be configured as a multi-function display capable of displaying a compilation of various kinds of information.

The present invention is not limited to a device that displays a radar echo screen. For instance, it can be applied to a device that displays an echo screen for sonar or a fish detector.

The present invention is not limited to an echo display device that is installed on a ship, and can also be applied to echo display devices that are installed in aircraft or land-based facilities, for example.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only a selected embodiment has been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An echo display device comprising:
    a display component configured to display an echo screen based on echo information inputted from an echo detection device;
    a cursor manipulation component configured to manipulate a cursor displayed on the echo screen; and
    a controller configured to control the display component so as to display the cursor on the echo screen, the controller including
        an echo display position acquisition component configured to acquire an echo display position that is the display position of an echo on the echo screen, and
        a cursor display position determination component configured to determine a cursor display position that is the display position of the cursor on the echo screen, based on manipulation of the cursor manipulation component,
    when the echo display position is within a specific range from a movement determination position, which is the cursor display position after the cursor has moved by manipulation of the cursor manipulation component, or when the movement determination position is within a specific range from the echo display position, the cursor display position determination component is configured to move the cursor display position to the echo display position.

2. The echo display device according to claim 1, wherein the controller includes a cursor movement orientation detector configured to detect the movement orientation of the cursor, and
    the cursor display position determination component is configured to move the cursor display position to the echo display position with the orientation closest to the movement orientation of the cursor when a plurality of echo display positions are within a specific range from the movement determination position, or when the movement determination position is within a specific range from the plurality of the echo display positions.

3. The echo display device according to claim 1, wherein the controller is configured to produce a list of echoes, arranged in order, when a plurality of echo display positions are within a specific range from the movement determination position, or when the movement determination position is within a specific range from a plurality of the echo display positions, and
    the cursor display position determination component is configured to successively switch the echo that is the destination of the cursor display position, according to the list, and in response to user manipulation.

4. The echo display device according to claim 1, wherein the cursor display position determination component is configured to cause the cursor display position to follow the movement of the echo display position when the echo display position has moved after the cursor display position is moved to the echo display position.

5. The echo display device according to claim 1, wherein the controller further includes a cursor movement speed detector configured to detect the movement speed of the cursor, and
    the cursor display position determination component is configured to set the cursor display position as the movement determination position when the movement speed of the cursor detected by the cursor movement speed detector is below a specific value.

6. The echo display device according to claim 1, wherein the cursor display position determination component is configured to set an echo detection range using the movement determination position as a reference, and
    the cursor display position determination component is configured to move the cursor display position to the echo display position when the echo is within the echo detection range.

7. The echo display device according to claim 6, wherein the profile of the echo detection range is set to vary based on at least one of the movement speed and the movement orientation of the cursor.

8. The echo display device according to claim 1, wherein the cursor display position determination component is configured to set a cursor detection range using the echo display position as a reference, and the cursor display position determination component is configured to move the cursor display position to the echo display position when the movement determination position is within the cursor detection range.

9. The echo display device according to claim 8, wherein the profile of the cursor detection range is set to vary based on the size of the echo.

10. The echo display device according to claim 9, wherein the profile of the cursor detection range is set to bulge out of the profile of the echo more for a smaller echo than for a larger echo.

11. The echo display device according to claim 8, wherein the profile of the cursor detection range is set to vary based on at least one of the movement speed and the movement orientation of the cursor.

12. The echo display device according to claim 8, wherein the cursor detection range of each of the echoes is set so as not to include other echoes.

13. The echo display device according to claim 8, wherein the cursor detection ranges of a plurality of the echoes are set so as not to overlap each other.

14. A cursor movement control method used with an echo display device that includes
a display component configured to display an echo screen based on echo information inputted from an echo detection device, and
a cursor manipulation component configured to be manipulated for moving a cursor displayed on the echo screen,
the method comprising:
acquiring an echo display position that is the display position of an echo on the echo screen;
determining a cursor display position that is the display position of the cursor on the echo screen, based on manipulation of the cursor manipulation component;
displaying the cursor at the cursor display position on the echo screen; and
judging whether the echo display position of the echo is within a specific range from a movement determination position, which is the cursor display position after the cursor has moved by manipulation of the cursor manipulation component, or the movement determination position is within a specific range from the echo display position of the echo, and
when the echo display position of the echo is within a specific range from a movement determination position, or the movement determination position is within a specific range from the echo display position of the echo, the cursor display position is moved to the echo display position.

* * * * *